United States Patent [19]

Ford et al.

[11] 3,932,276

[45] Jan. 13, 1976

[54] FILTRATION AIDS IN URANIUM ORE PROCESSING

[75] Inventors: Harold L. Ford, Arvada, Colo.; Nathan M. Levine, Stamford, Conn.; Alan Robert Risdon, S. River, N.J.

[73] Assignee: Stein, Hall & Co., Inc., New York, N.Y.

[22] Filed: May 9, 1974

[21] Appl. No.: 468,793

[52] U.S. Cl. ................... 210/54; 210/75; 423/17; 423/18
[51] Int. Cl.² ........................................ B01D 21/01
[58] Field of Search ................. 210/52–54, 210/75; 260/209 R; 423/3, 11, 17, 18

[56] References Cited
UNITED STATES PATENTS

| | | |
|---|---|---|
| 3,183,058 | 5/1965 | Peter ........................... 423/3 |
| 3,326,890 | 6/1967 | Engelskirchen ................. 260/209 R |
| 3,532,218 | 10/1970 | Blottnitz et al. ................ 210/54 |
| 3,700,612 | 10/1972 | Fath et al. ...................... 260/209 R |
| 3,723,408 | 3/1973 | Nordgrew et al. .............. 260/209 R |
| 3,830,736 | 8/1974 | Werdouschegg ................. 210/53 |

*Primary Examiner*—Thomas G. Wyse
*Assistant Examiner*—Peter A. Hruskoci
*Attorney, Agent, or Firm*—Herbert P. Price; K. A. Genoni; T. J. Morgan

[57] ABSTRACT

Improved flocculation efficiency and filtration of carbonate leached uranium ore pulps are obtained by incorporating hydroxyalkyl guars in the filter feed slurry.

6 Claims, No Drawings

FILTRATION AIDS IN URANIUM ORE PROCESSING

BACKGROUND OF THE INVENTION

The field of this invention is related to a hydrometallurgical process of extracting and leaching, and a process of liquid-solid separation with flocculation.

A widely used process for the extraction of uranium from uranium-bearing ores involves crushing and grinding the ore very finely, making a slurry or "mill feed pulp" from the finely ground ore and then leaching the pulp under agitation in order to dissolve the uranium which is present in the ore. The pulp is then treated with flocculants to aid in the separation of the pregnant solution of uranium from the ore tailings. The uranium is then separated from the pregnant solution by, for example, precipitation or ion exchange.

Dissolution of the ground ore can be carried out in either acid or alkaline leaching circuits. In ores cemented with clay, silica, or organic material, the acid leach may be preferred. Limestone containing ores or sandstone ores with a high percentage of calcite as grain-cementing material are generally leached in alkaline circuits.

Sulfuric acid is universally used in the acid leaching process. Sodium carbonate and sodium bicarbonate are used in the alkaline or "carbonate" leaching process. A liquid-solids separation problem generally arises in the thickening or filtration of leached uranium ore slurry. Since the loss of weight in leaching is usually small, virtually all of the ore must be handled by a multistage process to recover a pregnant solution of suitable uranium content while making a throw-away tailings product. Preroasting the ores and using common flocculating agents such as starches and glues have helped to accelerate the thickening and filtering of some ores, but have shown little benefit for others. Certain polysaccharides, such as locust bean gum, guar gum and cactus extract, as well as synthetic polymers, such as polyacrylamide, have been found to be better thickeners and flocculants than glues and starches.

Information pertaining to uranium ore processing can be found in "Uranium Ore Processing", edited by J. W. Clegg and D. D. Foley, Addison-Wesley Publishing Company, Inc., Reading, Massachusetts (1958) and in "The Extractive Metallurgy of Uranium" by R. C. Merritt, Colorado School of Mines Research Institute (1971).

SUMMARY OF THE INVENTION

This invention pertains to liquid-solids separation in the processing of uranium ore. In particular, this invention relates to liquid-solids separation of alkaline or "carbonate" leached uranium ore. More particularly this invention pertains to the use of hydroxyalkyl guar as a thickening and flocculating agent in the processing of carbonate leached uranium ore pulp.

By the process of this invention uranium ore pulps obtained by carbonate leaching of uranium ore are treated with an aqueous solution of hydroxyalkyl guar to flocculate the pulp to improve the filtration efficiency and separation of the uranium containing pregnant solution from the solid tailings. The hydroxyalkyl guar is used in the amount of about 0.1 to 2.0 pounds per ton of ore.

DESCRIPTION OF THE INVENTION

The hydroxyalkyl guars useful in this invention are derivatives of guar gum. Guar gum is a polysaccharide composed of galactose and mannose units and is, generically, a galactomannan. Guar gum is derived from the endosperm of the guar bean. The basic unit of the guar polymer contains two mannose units with a glycosidic linkage and a galactose unit attached to one of the hydroxyls of the mannose units. On the average, each of the sugar units has three available hydroxyl sites. The hydroxyalkyl guars useful in this invention are guar gums of which the hydroxyl groups have been etherified to hydroxyalkyl ether groups. Useful hydroxyalkyl guars are those wherein the alkyl group contains two or three carbon atoms, i.e., the beta hydroxyethyl or beta hydroxypropyl group. Hydroxyalkyl guars are made with hydroxyethyl or hydroxypropyl etherifying agents. Such agents are ethylene oxide, propylene oxide, ethylene chlorohydrin and propylene chlorohydrin. The guar particles are generally reacted with the etherifying agents under aqueous alkaline conditions. The preparation of hydroxyalkyl guars is described in such patents as U.S. Pat. Nos. 3,326,890, 3,350,386, 3,723,408 and 3,723,409.

The hydroxyalkyl guars useful in this invention will generally have a molar substitution (M.S.) of about 0.1 to 3.0 with the preferred M.S. being 0.2 to 1.2. Molar substitution (M.S.) refers to the number of units (mols of the derivatizing agent) which has reacted per sugar unit of the galactomannan polymer. For instance, when an average of 2 mols of ethylene oxide are reacted onto each sugar unit of guar, the M.S. is 2. When the M.S. is below about 0.1, little difference in performance is noted between the derivatized guar and the underivatized guar. If the M.S. is above about 3.0, the thickening and flocculating efficiency of the hydroxyalkyl guar is decreased below desirable levels. The preferred hydroxyalkyl guar for use in this process is hydroxypropyl guar.

The ore pulps which are treated by the process of this invention are slurries of uranium ore in aqueous solutions of sodium carbonate and sodium bicarbonate. These pulps are obtained by grinding the uranium ore in the sodium carbonate-sodium bicarbonate solutions, thereby leaching and dissolving the uranium from the ore. These pulps generally have a pH of about 9 to 12 and a solids content of about 40 to 60 weight percent.

In carrying out the process of this invention, an aqueous solution of hydroxyalkyl guar is added to the ore pulp to flocculate the solids which facilitates the filtration and separation of the pregnant uranium containing solution from the substantially uranium free solid tailings. The hydroxyalkyl guar is added as a 0.1 to 1 weight percent aqueous solution to the pulp and preferably as a 0.3 to 0.6 weight percent solution. The amount of hydroxyalkyl guar used will vary depending upon the composition of the ore but generally will be about 0.1 to 2 lbs. per ton of ore and preferably 0.3 to 1.0 lb. per ton. The temperature at which the flocculation and filtration takes place will vary from ambient temperatures up to about 200°F., and, preferably, 150° to 180°F. Any type of filtration apparatus can be used in this process, such as, for example, drum filters, leaf filters and disc filters.

When hydroxyalkyl guar is used as a flocculating agent for the pulp rather than conventional flocculating agents, improved flocculant efficiency is obtained. Less hydroxyalkyl guar is used per ton of ore than is conventionally used with other flocculating agents. Although it is preferred to use the hydroxyalkyl guar alone, mixtures of hydroxyalkyl guar and unsubstituted guar can be used. Mixtures of hydroxyalkyl guars with up to 75 weight percent, based on the total weight of the mixture, of unsubstituted guar have been used to obtain improved filtration efficiency.

The following examples are used to describe this invention in greater detail. Parts and percentages unless otherwise designated are parts and percentages by weight.

EXAMPLE 1

A carbonate leached uranium ore pulp had a density of 1500 grams/liter and a solids content of 52.0%. To 2800 grams of this pulp at a temperature of 170°F. were added 146 ml. of a 0.3 weight percent aqueous solution of hydroxypropyl guar having an M.S. of 0.4–0.5. This amount of hydroxypropyl guar is 0.6 pound per ton of ore. After thoroughly mixing, the slurry was filtered on a leaf filter using a nylon cloth and a vacuum of 19.2 inches of mercury. The cycle time on the filter was 30 seconds to feed and form the filter cake, 45 seconds to drain, 15 seconds to wash using water at ambient temperatures and 30 seconds to dry the cake by drawing air through it. This filtration using the same feed rate and filter cycle times was repeated three times. The average wet weight of the filter cake was 169.4 grams. The average weight after drying was 127.5 grams. The average weight percent water retained on the cake was 23.4%. The pounds of ore processed per square foot of filter per 24 hours processing based on this average calculates to 2026 pounds.

When unsubstituted guar was used in place of hydroxypropyl guar with all other conditions being the same, the average weight of wet cake was only 53.1 grams, the dry weight was 42.1 grams with the percentage of water being 21.0%. The pounds of ore processed per square foot of filter per 24 hours was only 669 pounds.

EXAMPLE 2

A different carbonate leached uranium ore pulp than used in Example 1 had a density of 1.543 and a solids content of 49.8%. This pulp was treated with hydroxypropyl guar having an M.S. of 0.4–0.5 as a 0.5 weight percent aqueous solution on the basis of 1 pound of hydroxypropyl guar per ton of ore. At a pulp temperature of 160°F., the pulp was fed to a leaf filter allowing 60 seconds to form the filter cake and 30 seconds to drain using 19 inches of mercury vacuum. The filter cake formed had a thickness of 7.0 to 8.0 mm. respectively from 2 runs. The filtrate was 45 and 67 mls. respectively.

When unsubstituted guar was used on the same basis (1 lb./ton) at a pulp temperature of 150°F., the filter cake had a thickness of 4.0 mm. on two runs and the filtrate was 28 mls. and 26 mls. respectively.

It is to be understood that the foregoing detailed description is given merely by way of illustration and that many variations may be made therein without departing from the spirit of the invention.

What is claimed is:

1. A process of improving the filtration efficiency and separation of uranium containing pregnant solutions from the solid tailings of uranium ore pulps obtained by carbonate leaching of uranium ore which comprises mixing said ore pulps with an aqueous solution containing 0.1 to 1 weight percent based on the total weight of the solution of hydroxyalkyl guar having a molar substitution (M.S.) of about 0.1 to 3.0 and selected from the group consisting of hydroxyethyl and hydroxypropyl guar in the amount of 0.1 to 2.0 pounds of hydroxyalkyl guar per ton of uranium ore and filtering said ore pulps and guar, said mixing and filtering taking place at a temperature of about 150° to 180°F.

2. The process of claim 1 wherein the hydroxyalkyl guar is hydroxypropyl guar having an M.S. of 0.1 to 3.0.

3. The process of claim 2 wherein the M.S. is 0.2 to 1.2.

4. The process of claim 1 wherein the aqueous solution contains 0.3 to 0.6 weight percent hydroxypropyl guar.

5. The process of claim 1 wherein the amount of hydroxyalkyl guar is 0.3 to 1.0 pound per ton of ore.

6. The process of claim 5 wherein the hydroxyalkyl guar is hydroxypropyl guar.

* * * * *